United States Patent
Kato

(10) Patent No.: US 11,180,638 B2
(45) Date of Patent: Nov. 23, 2021

(54) RESIN-REINFORCING FILLER AND RESIN COMPOSITION

(71) Applicant: Nippon Sheet Glass Company, Limited, Tokyo (JP)

(72) Inventor: Shinichi Kato, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/328,189

(22) PCT Filed: Aug. 23, 2017

(86) PCT No.: PCT/JP2017/030126
§ 371 (c)(1),
(2) Date: Feb. 25, 2019

(87) PCT Pub. No.: WO2018/043246
PCT Pub. Date: Mar. 8, 2018

(65) Prior Publication Data
US 2019/0233619 A1 Aug. 1, 2019

(30) Foreign Application Priority Data
Aug. 29, 2016 (JP) .............................. JP2016-166509

(51) Int. Cl.
*C08K 9/04* (2006.01)
*C08K 7/00* (2006.01)
(Continued)

(52) U.S. Cl.
CPC ................. *C08K 9/04* (2013.01); *C08K 3/00* (2013.01); *C08K 3/04* (2013.01); *C08K 3/34* (2013.01);
(Continued)

(58) Field of Classification Search
CPC ... C08K 9/04; C08K 3/00; C08K 3/04; C08K 3/34; C08K 5/06; C08K 7/00; C08K 7/02;
(Continued)

(56) References Cited

U.S. PATENT DOCUMENTS 3,066,065 A * 11/1962 Koerner ................. H01B 3/088
162/138
3,257,184 A  6/1966 Glaser
(Continued)

FOREIGN PATENT DOCUMENTS

JP  S41017148 B  9/1966
JP  S45003541 B  2/1970
(Continued)

OTHER PUBLICATIONS

English machine translation of JP 2015-137336. (Year: 2015).*
(Continued)

*Primary Examiner* — John E Uselding
(74) *Attorney, Agent, or Firm* — Hamre, Schumann, Mueller & Larson, P.C.

(57) ABSTRACT

A resin-reinforcing filler of the present invention includes: plate-like, spherical, or fibrous filler substrates; and a coating covering at least a portion of a surface of each of the substrates. The coating contains nanofibers having an average fiber width of 1 nm to 900 nm.

15 Claims, 2 Drawing Sheets

(51) Int. Cl.
*C08K 7/02* (2006.01)
*C08L 23/12* (2006.01)
*C08L 25/12* (2006.01)
*C08L 1/02* (2006.01)
*C08K 5/06* (2006.01)
*C08L 101/00* (2006.01)
*C08K 3/00* (2018.01)
*C08K 3/04* (2006.01)
*C08K 3/34* (2006.01)
*C08K 3/40* (2006.01)
*C08K 7/20* (2006.01)

(52) U.S. Cl.
CPC ............... *C08K 3/40* (2013.01); *C08K 5/06* (2013.01); *C08K 7/00* (2013.01); *C08K 7/02* (2013.01); *C08K 7/20* (2013.01); *C08L 1/02* (2013.01); *C08L 23/12* (2013.01); *C08L 25/12* (2013.01); *C08L 101/00* (2013.01); *C08K 2201/002* (2013.01); *C08K 2201/003* (2013.01)

(58) Field of Classification Search
CPC .... C08K 3/40; C08K 7/20; C08L 1/02; C08L 23/12; C08L 25/12; C08L 101/00
See application file for complete search history.

(56) References Cited

U.S. PATENT DOCUMENTS

| | | | |
|---|---|---|---|
| 5,087,518 A * | 2/1992 | Shimada | B29B 9/12 |
| | | | 428/325 |
| 8,383,531 B2 | 2/2013 | Fujiwara et al. | |
| 8,946,340 B2 | 2/2015 | Yagyu et al. | |
| 2004/0178383 A1 * | 9/2004 | Kikuchi | C08L 2666/02 |
| | | | 252/62 |
| 2011/0095241 A1 * | 4/2011 | Kong | H01B 1/22 |
| | | | 252/514 |
| 2014/0206798 A1 | 7/2014 | Oomori et al. | |
| 2015/0005413 A1 | 1/2015 | Yamazaki et al. | |
| 2016/0002484 A1 | 1/2016 | Geisen et al. | |
| 2016/0319176 A1 | 11/2016 | Konagaya et al. | |
| 2017/0232684 A1 * | 8/2017 | Yoshimura | C08K 3/40 |
| | | | 264/308 |
| 2018/0142071 A1 * | 5/2018 | Ju | C08K 3/40 |

FOREIGN PATENT DOCUMENTS

| | | |
|---|---|---|
| JP | S5921533 A | 2/1984 |
| JP | H02124732 A | 5/1990 |
| JP | H02503669 A | 11/1990 |
| JP | H051184 A | 1/1993 |
| JP | H09510427 A | 10/1997 |
| JP | 2005170691 A | 6/2005 |
| JP | 2013185096 A | 9/2013 |
| JP | 2015137336 A | 7/2015 |
| JP | 2015137338 A | 7/2015 |
| JP | 2017088792 A | 5/2017 |
| WO | 8808412 A1 | 11/1988 |
| WO | 9525074 | 9/1995 |
| WO | 2006068255 A1 | 6/2006 |
| WO | 2013042654 A1 | 3/2013 |
| WO | 2013122209 A1 | 8/2013 |
| WO | WO-2015199482 A1 * | 12/2015 ............... C08K 3/08 |
| WO | 2016043146 A1 | 3/2016 |

OTHER PUBLICATIONS

Extended European Search Report issued for European Patent Application No. 17846251.1, dated Mar. 17, 2020, 6 pages.
International Search Report issued for International Patent Application No. PCT/JP2017/030126, dated Nov. 28, 2017, 5 pages including English translation.

* cited by examiner

RESIN-REINFORCING FILLER AND RESIN COMPOSITION

TECHNICAL FIELD

The present invention relates to a resin-reinforcing filler and a resin composition including the resin-reinforcing filler.

BACKGROUND ART

For resin molded articles, it is commonly known that glass fibers, carbon fibers, mica, glass beads, glass flakes, or the like are added as a resin-reinforcing filler to a matrix resin to achieve reduction in warping and deformation and/or improvement of mechanical strength. For such a resin molded product, it has been considered preferable to surface-treat the filler with a silane coupling agent or the like to enhance the adhesion between the matrix resin and the filler and thereby further increase the mechanical strength of the resin molded article (e.g., Patent Literature 1). Additionally, various treatment agents such as a silane coupling agent and a modified polyolefin resin-containing treatment agent have been proposed as treatment agents suitable for surface treatment of glass fibers included as a resin-reinforcing filler in resin molded articles (e.g., Patent Literatures 2 and 3).

CITATION LIST

Patent Literature

Patent Literature 1: JP H05(1993)-001184 A
Patent Literature 2: JP H09(1997)-510427 A
Patent Literature 3: JP 2005-170691 A

SUMMARY OF INVENTION

Technical Problem

For use in surface treatment of resin-reinforcing fillers, various treatment agents have been proposed as described above. Such conventional treatment agents can indeed improve the adhesion between a filler and a matrix resin to some extent and thereby can improve the mechanical strength of the resultant resin molded article. However, the obtained mechanical strength is still unsatisfactory, and a further improvement has been demanded.

It is therefore an object of the present invention to provide a resin-reinforcing filler capable, when used as a filler for reinforcing a resin molded article, of further improving the mechanical strength of the resin molded article. Another object of the present invention is to provide a resin composition that contains such a resin-reinforcing filler and from which a resin molded article having high mechanical strength can be obtained.

Solution to Problem

The present invention provides a resin-reinforcing filler, including:
plate-like, spherical, or fibrous filler substrates; and
a coating covering at least a portion of a surface of each of the substrates, wherein
the coating contains nanofibers having an average fiber width of 1 nm to 900 nm.
The present invention also provides a resin composition including: the resin-reinforcing filler of the present invention; and a matrix resin.

Advantageous Effects of Invention

By virtue of including the nanofiber-containing coating, the resin-reinforcing filler of the present invention is capable, when used as a filler for reinforcing a resin molded article, of further improving the mechanical strength of the resin molded article compared to conventional fillers. The resin composition of the present invention, which includes such a resin-reinforcing filler of the present invention, can be used to obtain a resin molded article having high mechanical strength.

DESCRIPTION OF EMBODIMENTS

Figure 1:
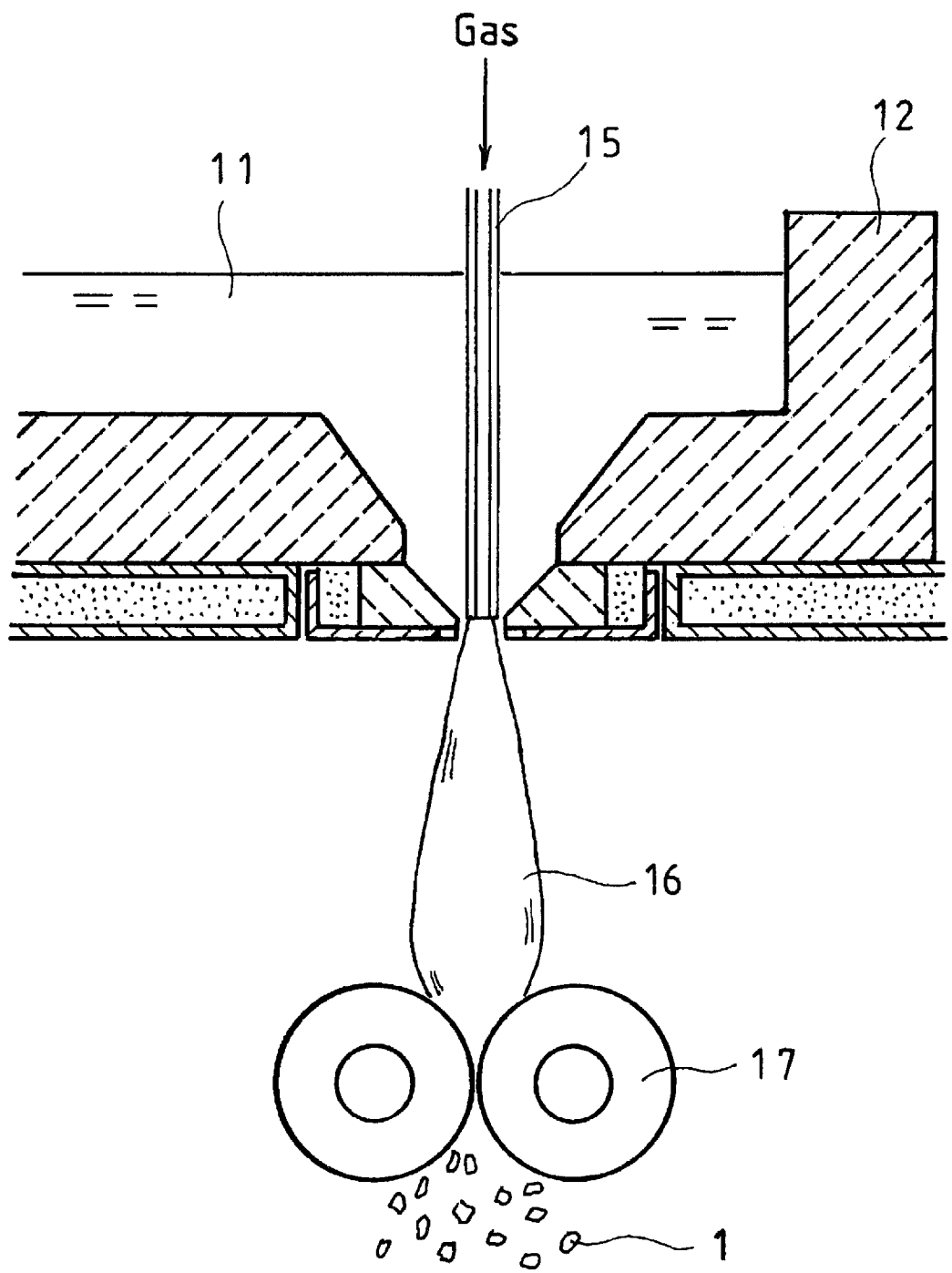
FIG. 1 is a schematic diagram illustrating an example of a production apparatus of glass flake substrates.

Hereinafter, an embodiment of the present invention will be described in detail.

A resin-reinforcing filler of the present embodiment includes: plate-like, spherical, or fibrous filler substrates; and a coating covering at least a portion of a surface of each of the substrates. The coating contains nanofibers having an average fiber width of 1 nm to 900 nm.

It is commonly known that addition of a filler such as glass flakes to a matrix resin improves the mechanical strength of a molded article including the resultant resin composition. The present inventors have found a new idea of applying this resin-reinforcing technique also to the interfacial region between a micro filler and a matrix resin, and have made the above resin-reinforcing filler of the present embodiment provided with the nanofiber-containing coating. The resin-reinforcing filler of the present embodiment includes the nanofiber-containing coating. It is thought that when the resin-reinforcing filler of the present embodiment is added to a matrix resin, the strength is improved in the interfacial region between the filler and the matrix resin due to the coating. This allows the resin-reinforcing filler of the present embodiment to be capable, when used as a filler for reinforcing a resin molded article, of further improving the mechanical strength of the resin molded article compared to conventional fillers. The resin-reinforcing filler of the present embodiment will be described in more detail hereinafter.

Plate-like, spherical, or fibrous substrates can be used as the filler substrates. Therefore, substrates known as substrates for a filler included in resin molded articles can be used as the filler substrates.

The filler substrates may be inorganic substrates made of an inorganic material or may be organic substrates made of an organic material. When the substrates are inorganic substrates, substrates made of, for example, at least one selected from the group consisting of glass, mica, talc, wollastonite, kaolin, calcium carbonate, montmorillonite, silica, alumina, aramid, and carbon can be used. Examples of the organic substrates include substrates made of aramid, polyamide, polyester, polyethylene, polypropylene, acrylic, and rayon. Additionally, for example, substrates made of cotton, hemp, and silk, which are naturally fibrous in a typical case, can also be used as the organic substrates.

The shape of the substrates is, as described above, plate-like, spherical, or fibrous. When the substrates are plate-like substrates, their average thickness and average particle diameter are not particularly limited, and can be, for example, 0.1 to 7 µm and 5 to 2000 µm, respectively. The method for measuring the average thickness and average particle diameter of the plate-like substrates is the same as the later-described method for measuring those of glass flake substrates.

Examples of the plate-like substrates include glass flake substrates. The glass flake substrates can be produced, for example, by so-called blow process as disclosed in JP S41(1966)-017148 B or JP S45(1970)-003541 B or so-called rotary process as disclosed in JP S59(1984)-021533 A or JP H02(1990)-503669 A.

For the blow process, a glass production apparatus shown in FIG. 1 can be employed. The glass production apparatus is equipped with a refractory tank furnace 12, blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain glass flake substrates 1. The thickness of the glass flake substrates 1 can be controlled by adjusting, for example, the speed of pulling the hollow glass 16 and flow rate of the gas delivered through the blowing nozzle 15.

Figure 2:
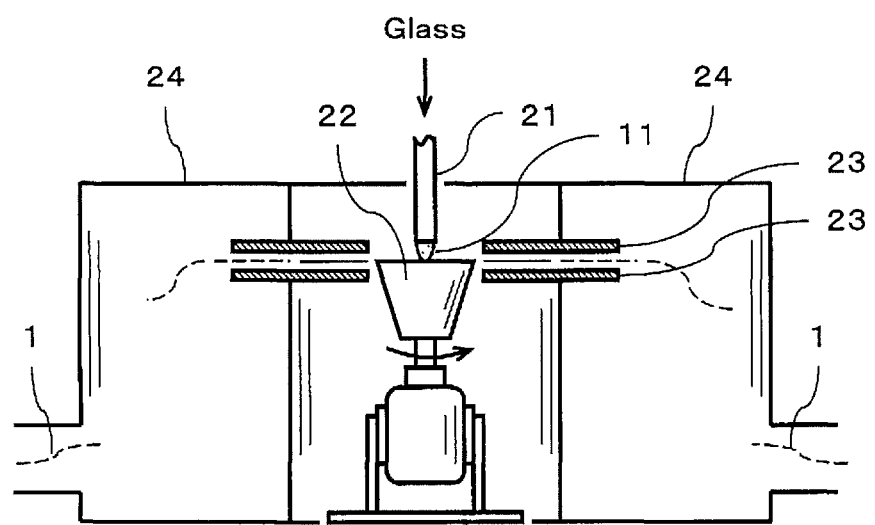
FIG. 2 is a schematic diagram illustrating another example of a production apparatus of glass flake substrates.

For the rotary process, a glass production apparatus shown in FIG. 2 can be employed. The glass production apparatus is equipped with a rotary cup 22, pair of annular plates 23, and annular cyclone collector 24. A molten glass raw material 11 is poured into the rotary cup 22, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give glass flake substrates 1. The thickness of the glass flake substrates 1 can be controlled by adjusting, for example, the distance between the annular plates 23 and velocity of the airflow.

Commonly-known glass compositions can be used as the composition of the glass flake substrates. Specifically, a glass with a low alkali metal oxide content, such as E-glass, can be suitably used. A typical composition of E-glass is shown below. In the composition, the unit is mass %.

$SiO_2$: 52 to 56
$Al_2O_3$: 12 to 16
CaO: 16 to 25
MgO: 0 to 6
$Na_2O+K_2O$: 0 to 2 (Preferably 0 to 0.8)
$B_2O_3$: 5 to 13
$F_2$: 0 to 0.5

For the glass with a low alkali metal oxide content, a glass composition including the following components in mass % and substantially free of $B_2O_3$, F, ZnO, BaO, SrO, and $ZrO_2$ can be employed:

$59 \leq SiO_2 \leq 65$,
$8 \leq Al_2O_3 \leq 15$,
$47 \leq (SiO_2-Al_2O_3) \leq 57$,
$1 \leq MgO \leq 5$,
$20 \leq CaO \leq 30$,
$0 < (Li_2O+Na_2O+K_2O) < 2$, and
$0 \leq TiO_2 \leq 5$.

This glass composition is disclosed by the present applicant in WO 2006/068255 A1.

Being "substantially free" means that the components are not intentionally included except for those inevitably introduced from, for example, industrial materials. Specifically, being "substantially free" means that the content of each of $B_2O_3$, F, ZnO, BaO, SrO, and $ZrO_2$ is less than 0.1 mass % (preferably less than 0.05 mass % and more preferably less than 0.03 mass %).

The average thickness and average particle diameter of the glass flake substrates are not particularly limited. The thinner the glass flake substrates are, the larger the aspect ratio (a value calculated by dividing the average particle diameter by the average thickness) of the glass flake substrates is, and thus the higher the blocking effect against penetration of water or gas into a resin composition filled with the glass flakes is, but the lower the workability is. The average thickness and average particle diameter can be determined in view of the balance among, for example, the blocking effect, reinforcing effect on resin molded articles, workability, degree of technical difficulty, and product cost effectiveness. Specifically, the use of glass flake substrates with an average thickness of 10 µm or less and an aspect ratio of 50 or more for production of the glass flakes is preferred to ensure a good balance among the blocking effect, reinforcing effect on resin molded articles, workability, and product cost effectiveness. In view of the degree of technical difficulty and the product cost effectiveness, the average thickness is preferably 0.1 µm or more. To more effectively achieve the reinforcing effect on resin molded articles, the average particle diameter is preferably 10 to 2000 µm. The average aspect ratio is preferably 2000 or less in view of the dispersibility in resins. Therefore, when the glass flake substrates are used as the plate-like substrates, the glass flake substrates having an average thickness of 0.1 to 10 µm and an average particle diameter of 10 to 2000 µm are preferably used. The average thickness of the glass flake substrates, as used herein, is a value determined by extracting 100 or more glass flake substrates, measuring the thickness thereof with a scanning electron microscope (SEM), and dividing the sum of the thickness values by the number of the glass flake substrates. The average particle diameter is a particle diameter (D50) at a cumulative mass percentage of 50% in a particle size distribution measured by a laser diffraction-scattering method.

Another example of the plate-like substrates preferably used is mica.

When the substrates are spherical substrates, their average particle diameter is not particularly limited. The average particle diameter can be, for example, 5 to 3000 µm. The shape of the spherical substrates does not need to be perfectly spherical and may be ellipsoidal. It is sufficient for the spherical substrates to have a nearly spherical shape. Examples of the spherical substrates include glass beads. The glass composition of the glass beads is not particularly limited as is the case for the above glass flakes, and a commonly-known glass composition can be used. Specific examples include compositions mentioned as examples of the glass compositions of the glass flake substrates. The average particle diameter of the spherical substrates is a particle diameter (D50) at a cumulative mass percentage of 50% in a particle size distribution measured by a laser diffraction-scattering method.

When the substrates are fibrous substrates, their average fiber width (fiber diameter) and average fiber length are not particularly limited. The average fiber width can be, for example, 1 to 20 µm. As the fibrous substrates, continuous fibers may be used as they are, or chopped fibers made by cutting a fiber into a certain length can also be used. The chopped fibers made by cutting a fiber into a certain length can have an average fiber length of, for example, 1 to 13 mm. The average of the fiber diameters can be determined using a method according to Japanese Industrial Standards (JIS) R 3420: 2013.

Examples of the fibrous substrates include glass fibers and carbon fibers. The glass composition of the glass fibers is not particularly limited as is the case for the above glass flakes, and a commonly-known glass composition can be used. Specific examples include compositions mentioned as examples of the glass compositions of the glass flake substrates. As the carbon fibers, both PAN-based and pitch-based carbon fibers can be used.

The coating covers at least a portion of a surface of each of the filler substrates. The coating contains nanofibers. The average fiber width of the nanofibers contained in the coating is 1 nm to 900 nm, preferably 5 nm to 500 nm, more preferably 10 nm to 350 nm, and even more preferably 30 nm to 250 nm. The fiber length of the nanofibers is, for example, but not particularly limited to, 100 nm to several tens of μm, preferably 150 nm to 20 μm, and more preferably 200 nm to 15 μm. The average fiber width and fiber length can be determined by measuring the fiber width and fiber length of 100 nanofibers with a SEM.

Examples of the nanofibers include cellulose nanofibers, carbon nanofibers, and ceramic nanofibers (nanofibers made of alumina, zirconium oxide, titanium oxide, lead zirconate titanate, or the like).

Cellulose nanofibers are a nanomaterial mainly composed of cellulose, which is a basic skeleton material of plants, and are an ultrafine fibrous material typically having an average fiber width of 1 nm to several hundreds of nm and a length of several hundreds of nm to several tens of μm. To obtain cellulose nanofibers, a cellulosic material is processed into ultrafine pieces and subjected to, for example, chemical-treatment in part. When a raw material of cellulose nanofibers is wood, cellulose nanofibers are roughly divided into nanofibers derived from mechanical pulp, chemical pulp, and used paper pulp. Each pulp is subdivided into hardwood pulp and softwood pulp. The type of the cellulose nanofibers used in the coating is not particularly specified. In the case where a polypropylene resin is used as a matrix resin, high hydrophobicity is preferred in view of the compatibility with the polypropylene resin and cellulose nanofibers derived from mechanical pulp are preferred, although the preference for mechanical pulp depends on the chemical treatment method used.

The coating may be consisting of the nanofibers, or may further include an additional material in view of the adhesion to the matrix resin and the workability. The additional material included in the coating is not particularly limited, and one or more additional materials such as coupling agents, surfactant, resins, crosslinking agents, and others such as lubricants and anti-foaming agents can be used. The mass ratio between the nanofibers and the additional material (mass of nanofibers:total mass of additional material) in the coating is 1:99 to 100:0, preferably 3:97 to 60:40, and more preferably 5:95 to 40:60. The mass ratio between the nanofibers and the additional material in the coating can be determined by the ratio of solids obtained by excluding solvents such as water from a treatment agent used for formation of the coating. That is, in the treatment agent used, the ratio between the mass of solids of the nanofibers and the mass of solids of the additional material can be the above mass ratio. When the coating consists of the nanofibers, the nanofibers account for 100% of the solids in the treatment agent.

Examples of the resin contained in the coating include a modified polyolefin resin (e.g., an epoxy-modified polyolefin resin), epoxy resin, polyurethane resin, and acrylic resin (e.g., a copolymer resin of a styrene-acrylic monomer).

Examples of the coupling agent contained in the coating include silane coupling agents such as γ-aminopropyltriethoxysilane, γ-aminopropyltrimethoxysilane, γ-ureidopropyltriethoxysilane, γ-glycidoxypropyltrimethoxysilane, vinyltriethoxysilane, and γ-methacryloxypropyltrimethoxysilane. Among these, γ-aminopropyltriethoxysilane, γ-aminopropyltrimethoxysilane, and γ-ureidopropyltriethoxysilane are suitably used. A titanium coupling agent, aluminum coupling agent, or zirconia coupling agent can be used in addition to a silane coupling agent.

It is sufficient for the coating to cover at least a portion of the surface of the filler substrates. The coating desirably covers the entire surface of the filler substrates. With the coating covering the entire surface of the substrates, the strength is improved in the interfacial region between the entire surface of the resin-reinforcing filler of the present embodiment and the matrix resin and thereby the strength of the resultant resin molded article is further improved.

The method for forming the coating is not particularly limited. For example, the coating covering at least a portion of the surface of the substrates can be formed by preparing the treatment agent for forming the coating, adding the treatment agent to the filler substrates, which are stirred and then dried. The treatment agent can be obtained by uniformly dispersing the nanofibers and, if necessary, the additional material in a solvent such as water. The method for accomplishing the addition of the treatment agent to the filler substrates, stirring, and drying is not limited to specific ones. Examples of the method will be described hereinafter.

For example, the filler substrates are fluidized in a mixer such as a rotary disk mixer or a Henschel mixer having a mixing vessel equipped with a rotating blade, a predetermined amount of the treatment agent is added to the flowing filler substrates by a means such as a spray, and the filler substrates and treatment agent are mixed and stirred. Then, the filler substrates are dried under stirring in the mixer, or the filler substrates are taken out of the mixer and dried. By this method, a resin-reinforcing filler provided with a coating can be obtained.

In another example, the resin-reinforcing filler can be produced by tumbling granulation as described in JP H02 (1990)-124732 A. That is, the resin-reinforcing filler can be produced by placing the filler substrates in a horizontal oscillating granulator equipped with a stirring blade, spraying the treatment agent onto the filler substrates, and performing granulation.

The resin-reinforcing filler can be produced also by using known methods other than the above examples, such as methods generally called stirring granulation, fluidized bed granulation, injection granulation, and rotary granulation.

The drying step is accomplished, for example, by heating the filler substrates to a temperature equal to or higher than the boiling point of the solvent used in the treatment agent and drying the filler substrates until the solvent fully evaporates.

The proportion of the coating in the resin-reinforcing filler can be controlled by adjusting the concentration of the solids in the treatment agent to be added or sprayed. That is, the resin-reinforcing filler having a predetermined proportion of the coating can be produced by adding or spraying a predetermined amount of the treatment agent onto a predetermined amount of the filler substrates so that a predetermined amount of the solids is adhered to the resin-reinforcing filler.

The proportion of the coating in the resin-reinforcing filler is preferably 0.05 to 3 mass % and more preferably 0.4 to 1.0 mass %. If the proportion of the coating is less than 0.05 mass %, covering of the filler substrates by the coating may be insufficient, and the insufficient covering can cause a decrease in the strength of the resultant resin molded article. If the proportion of the coating is more than 3 mass %, the coating is excess and thus problems such as a decrease in the strength of the resultant resin molded article can be caused.

The coating provided on the surface of the substrates may be formed of one layer formed by applying one treatment agent onto the substrates once. Alternatively, the coating provided on the surface of the substrates may be formed of a plurality of layers formed by applying one treatment agent a plurality of times or by applying a plurality of treatment agents in separate steps. When the coating is formed of a plurality of layers, the nanofibers may be included in any of the layers and are preferably included in every layer. In other words, it is preferred that the nanofibers are dispersed throughout the coating provided on the surface of the substrates.

Next, the resin composition of the present embodiment will be described.

The resin composition of the present embodiment includes the above-described resin-reinforcing filler of the present embodiment and a matrix resin.

The matrix resin is not particularly limited, and examples thereof include: polyolefins such as polybutylene, polypropylene, and polyethylene; polyesters such as thermoplastic polyester resins typified by polybutylene terephthalate; polycarbonate; polyvinyl chloride; polystyrene; polyamide; copolymers thereof polyphenylene sulfide; polyphenylene ether; polyetheretherketone; and liquid-crystal polymers (including types I, II, and III). The resin-reinforcing filler of the present embodiment can exhibit high reinforcing effect on a resin molded article especially when a polyolefin is used as the matrix resin. In particular, when the polyolefin used is polypropylene, the resin-reinforcing filler of the present embodiment can exhibit higher reinforcing effect.

The content of the resin-reinforcing filler in the resin composition is preferably 5 to 70 mass %. Controlling the content to 5 mass % or more allows the resin-reinforcing filler to fully exhibit its function as a reinforcing material. Controlling the content to 70 mass % or less allows the resin-reinforcing filler to be uniformly dispersed in the resin composition. The content of the resin-reinforcing filler is more preferably controlled to 15 mass % or more and 60 mass % or less to further reduce the molding shrinkage.

A resin molded article produced using the resin composition of the present embodiment can have high tensile strength and high flexural strength by virtue of the reinforcing effect of the resin-reinforcing filler. Additionally, the molding shrinkage of the resin composition of the present embodiment is low, and a resin molded article having high dimensional stability can thus be obtained using the resin composition.

EXAMPLES

Hereinafter, the embodiment of the present invention will be described in more detail with Examples and Comparative Examples.

Example 1

(Resin-Reinforcing Filler)

In this Example, glass flake substrates were used as filler substrates. First, E-glass having a composition shown in Table 1 was used to produce glass flake substrates by a blow process as described with reference to FIG. 1. Specifically, the E-glass was placed and melted in a melting furnace heated to 1200° C. or higher. Air was blown from a nozzle into the molten glass to form thin glass, and this thin glass was continuously pulled out by rollers. The amount of the blown air and the rotation speed of the rollers were controlled to give glass with an average thickness of 0.7 μm. Afterwards, the glass was crushed, and the crushed glass was classified to give glass flake substrates having an average particle diameter of 160 μm. Glass flake substrates with a uniform size can be obtained by crushing into glass flake substrates, followed by classification of the glass flake substrates by means of a sieve having an appropriate opening size.

TABLE 1

| (Unit: mass %) | |
| --- | --- |
|  | E-glass |
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Others | 1.2 |

Next, 5 kg of the glass flake substrates were placed in a Henschel mixer, and a treatment agent was added using a spray. While the treatment agent was being added, the substrates and treatment agent were mixed and stirred for 15 minutes. The treatment agent contained solid components including cellulose nanofibers as nanofibers, γ-aminopropyltriethoxysilane as a silane coupling agent, and an epoxy-modified polyolefin resin as a resin and further contained water as a solvent. Of the solid components in the treatment agent, the nanofibers accounted for 10 mass %, the silane coupling agent accounted for 45 mass %, and the resin accounted for 45 mass %. The cellulose nanofibers used were mechanical pulp nanofibers (bleached softwood pulp nanofibers) manufactured by Daio Paper Corporation. The mechanical pulp nanofibers had an average fiber width of 249 nm and an average fiber length of 11.8 μm. The epoxy-modified polyolefin resin used was ethylene-glycidyl methacrylate copolymer (glycidyl methacrylate content: about 15 mass %) which may hereinafter be referred to as "PE-GMA". After the stirring, a resin-reinforcing filler (undried) was taken out of the mixer and dried by a dryer at 125° C. for 8 hours to obtain glass flakes of Example 1. Cellulose nanofibers as used in this Example, which are made from mechanical pulp (bleached softwood pulp nanofibers), are namely mechanical pulp-derived nanocellulose whose raw material is pulp obtained by crushing wood by physical force. Because of a high content of lignin, the nanocellulose is expected to have good drainability and high processing efficiency and be better mixed with hydrophobic materials.

Hereinafter, the method for measuring the average fiber width and average fiber length of the cellulose nanofibers will be described. For the measurement of the average fiber width (average fiber diameter), a specimen was prepared by: filtering a sufficiently diluted aqueous dispersion of the cellulose nanofibers with a Teflon (registered trademark) membrane filter; subjecting the filtrate to solvent replacement by ethanol and then two or more repetitions of solvent replacement by t-butanol; freeze-drying the resultant liquid; and providing an osmium coating. With the use of the specimen, 100 cellulose nanofibers were observed with a field emission scanning electron microscope (S-4700, manufactured by Hitachi High-Technologies Corporation) to measure the fiber width and fiber length of each cellulose nanofiber. The average values of the fiber width and fiber length of the 100 nanofibers were determined as the average fiber width and average fiber length. The same method for measuring the average fiber width and average fiber length of nanofibers was also used in the following Examples and Comparative Examples.

The proportion (adhesion ratio) of the coating in the obtained resin-reinforcing filler was examined by loss on ignition. Specifically, a proper amount of the resin-reinforcing filler was dried at 110° C. and then heated in an atmosphere at 625° C. to remove the coating from the surface of the glass flakes. The adhesion ratio of the coating in the resin-reinforcing filler was calculated from the difference between the mass of the resin-reinforcing filler before the heating and the mass of the resin-reinforcing filler after the heating. The result is shown in Table 2.

(Resin Molded Article)

The resin-reinforcing filler of Example 1 and polypropylene (NOVATEC BC06C, manufactured by Japan Polypropylene Corporation) were kneaded by an extrusion molding machine (KZW15-30MG, manufactured by Technovel Corporation; molding temperature=about 210 to 220° C.) to obtain a resin composition including polypropylene as a matrix resin and the resin-reinforcing filler. This resin composition was molded by an injection molding machine (HM7, manufactured by Nissei Plastic Industrial Co., Ltd.) to obtain a resin molded article. The content of the glass flakes in the obtained resin molded article was 30 mass %.

The properties of the resin molded article were examined. The maximum tensile strength and tensile strain were measured according to JIS K 7113. The maximum flexural strength and flexural modulus were measured according to JIS K 7171. The Izod impact strength was measured according to JIS K 7111-1. The measurement results are shown in Table 2.

Examples 2 to 4

Examples 2 to 4

Resin-reinforcing fillers of Examples 2 to 4 were produced in a similar manner to that of Example 1. In Examples 2 to 4, the proportion of the cellulose nanofibers in the coating was changed to 20 mass % and, accordingly, the proportions of the silane coupling agent and resin were decreased to 40 mass % each. The cellulose nanofibers used in Example 2 were the same mechanical pulp fibers (bleached pulp fibers) manufactured by Daio Paper Corporation as those used in Example 1. The cellulose nanofibers used in Example 3 were chemical pulp fibers (average fiber width: 148 nm; average fiber length: 8.3 µm) manufactured by Daio Paper Corporation. The cellulose nanofibers used in Example 4 were used paper pulp fibers (bleached pulp fibers made from magazine waste paper, average fiber width: 206 nm, average fiber length: 2.0 µm) manufactured by Daio Paper Corporation. Cellulose nanofibers as used in Example 3, which are made from chemical pulp, are namely chemical pulp-derived nanocellulose which is the most conventional nanocellulose whose raw material is pulp obtained by chemical treatment. Because of a low content of lignin which is hydrophobic, such nanocellulose features a high water retaining capacity and good suitability for use with hydrophilic materials. Cellulose nanofibers as used in Example 4, which are made from used paper pulp (bleached pulp made from magazine waste paper), are namely used paper pulp-derived nanocellulose which includes fine inorganic particles in nanocellulose derived from magazine waste paper. Because of the inclusion of fine inorganic particles, the nanocellulose is expected to achieve the reinforcing effect at low cost when blended with the resin. The nanocellulose has a high content of lignin and is thus expected to be well-mixed with hydrophobic materials.

The proportion of the coating in the obtained resin-reinforcing fillers was measured in the same manner as in Example 1. Resin molded articles were also produced and their various properties were measured in the same manner as in Example 1. The results are shown in Table 2.

Comparative Example 1

A resin-reinforcing filler of Comparative Example 1 was produced in the same manner as that of Example 1, except that no cellulose nanofibers were contained in the coating and, accordingly, the proportions of the silane coupling agent and resin were increased to 50 mass % each. The proportion of the coating in the obtained resin-reinforcing filler was measured in the same manner as in Example 1. A resin molded article was also produced and its various properties were measured in the same manner as in Example 1. The results are shown in Table 2.

TABLE 2

|  |  | Example 1 | Example 2 | Example 3 | Example 4 | Comparative Example 1 |
| --- | --- | --- | --- | --- | --- | --- |
| Coating | Filler substrates | Glass flakes | Glass flakes | Glass flakes | Glass flakes | Glass flakes |
|  | Adhesion ratio (mass %) | 0.6 | 0.6 | 0.6 | 0.6 | 0.6 |
|  | Proportion of coupling agent (mass %) | 45 | 40 | 40 | 40 | 50 |
|  | Proportion of resin (mass %) | 45 | 40 | 40 | 40 | 50 |
|  | Proportion of cellulose nanofibers (mass %) | 10 | 20 | 20 | 20 | 0 |
|  | Type of resin | PE-GMA | PE-GMA | PE-GMA | PE-GMA | PE-GMA |
|  | Type of cellulose nanofibers | Derived from mechanical pulp | Derived from mechanical pulp | Derived from chemical pulp | Derived from used paper pulp | — |
| Matrix resin |  | Polypropylene | | | | |

TABLE 2-continued

|  |  | Example 1 | Example 2 | Example 3 | Example 4 | Comparative Example 1 |
|---|---|---|---|---|---|---|
| Properties of molded article | Maximum tensile strength (MPa) | 43 | 44 | 43 | 43 | 43 |
|  | Tensile strain (%) | 3.6 | 3.6 | 3.5 | 3.5 | 3.4 |
|  | Maximum flexural strength (MPa) | 90 | 90 | 89 | 89 | 87 |
|  | Flexural modulus (MPa) | 4.1 | 4.2 | 4.0 | 4.0 | 4.0 |
|  | Izod impact strength N*2 (kJ/m$^2$) | 1.4 | 2.2 | 1.7 | 1.7 | 1.2 |
|  | Izod impact strength UN*1 (kJ/m$^2$) | 20 | 22 | 20 | 21 | 20 |

Notes
*1 Un-notched
*2 Notched

Example 5

A resin-reinforcing filler of Example 5 was produced in the same manner as that of Example 2, except that the filler substrates were changed from glass flakes as used in the resin-reinforcing filler of Example 1 to mica (Suzorite mica 150-S, manufactured by Suzorite Mining Inc. and having an average particle diameter of 150 μm). The proportion of the coating in the obtained resin-reinforcing filler was measured in the same manner as in Example 1. A resin molded article was also produced and its various properties were measured in the same manner as in Example 1. The results are shown in Table 3.

Comparative Example 2

A resin-reinforcing filler of Comparative Example 2 was produced in the same manner as that of Example 5, except that no cellulose nanofibers were contained in the coating and, accordingly, the proportions of the silane coupling agent and resin were increased to 50 mass % each. The proportion of the coating in the obtained resin-reinforcing filler was measured in the same manner as in Example 1. A resin molded article was also produced and its various properties were measured in the same manner as in Example 1. The results are shown in Table 3.

TABLE 3

|  |  | Example 5 | Comparative Example 2 |
|---|---|---|---|
| Coating | Filler substrates | Mica | Mica |
|  | Adhesion ratio (mass %) | 0.6 | 0.6 |
|  | Proportion of coupling agent (mass %) | 40 | 50 |
|  | Proportion of resin (mass %) | 40 | 50 |
|  | Proportion of cellulose nanofibers (mass %) | 20 | 0 |
|  | Type of resin | PE-GMA | PE-GMA |
|  | Type of cellulose nanofibers | Derived from mechanical pulp | — |
| Matrix resin |  | Polypropylene |  |

TABLE 3-continued

|  |  | Example 5 | Comparative Example 2 |
|---|---|---|---|
| Properties of molded article | Maximum tensile strength (MPa) | 33 | 32 |
|  | Tensile strain (%) | 2.0 | 1.8 |
|  | Maximum flexural strength (MPa) | 63 | 61 |
|  | Flexural modulus (MPa) | 4.4 | 4.2 |
|  | Izod impact strength N*2 (kJ/m$^2$) | 1.9 | 1.4 |
|  | Izod impact strength UN*1 (kJ/m$^2$) | 11 | 10 |

Notes
*1 Un-notched
*2 Notched

Example 6

A resin-reinforcing filler of Example 6 was produced in the same manner as that of Example 2, except that the filler substrates were changed from glass flakes as used in the resin-reinforcing filler of Example 1 to low-alkali glass beads (EGB731A, manufactured by Potters-Ballotini Co., Ltd.). The average particle diameter of the glass beads was 20 μm. The proportion of the coating in the obtained resin-reinforcing filler was measured in the same manner as in Example 1. A resin molded article was also produced and its various properties were measured in the same manner as in Example 1. The results are shown in Table 4.

Comparative Example 3

A resin-reinforcing filler of Comparative Example 3 was produced in the same manner as that of Example 6, except that no cellulose nanofibers were contained in the coating and, accordingly, the proportions of the silane coupling agent and resin were increased to 50 mass % each. The proportion of the coating in the obtained resin-reinforcing filler was measured in the same manner as in Example 1. A resin molded article was also produced and its various properties were measured in the same manner as in Example 1. The results are shown in Table 4.

TABLE 4

| | | Example 6 | Comparative Example 3 |
|---|---|---|---|
| Coating | Filler substrates | Glass beads | Glass beads |
| | Adhesion ratio (mass %) | 0.6 | 0.6 |
| | Proportion of coupling agent (mass %) | 40 | 50 |
| | Proportion of resin (mass %) | 40 | 50 |
| | Proportion of cellulose nanofibers (mass %) | 20 | 0 |
| | Type of resin | PE-GMA | PE-GMA |
| | Type of cellulose nanofibers | Derived from mechanical pulp | — |
| | Matrix resin | Polypropylene | |
| Properties of molded article | Maximum tensile strength (MPa) | 27 | 26 |
| | Tensile strain (%) | 2.3 | 2.3 |
| | Maximum flexural strength (MPa) | 48 | 47 |
| | Flexural modulus (MPa) | 1.4 | 1.4 |
| | Izod impact strength N[*2] (kJ/m$^2$) | 1.8 | 1.7 |
| | Izod impact strength UN[*1] (kJ/m$^2$) | 14 | 13 |

Notes
[*1]Un-notched
[*2]Notched

Examples 7 to 10

Resin-reinforcing glass flakes of Example 7 were produced in the same manner as those of Example 1, except that the type of the resin in a binder for forming the coating was changed from PE-GMA to a 1:1 mixture of an epoxy resin and styrene-acrylic copolymer resin (which may hereinafter be referred to as "AS"). Resin-reinforcing glass flakes of Example 8 were produced in the same manner as the resin-reinforcing glass flakes of Example 7, except that the cellulose nanofibers were changed from cellulose mechanical pulp-derived nanofibers to used paper pulp-derived cellulose nanofibers as used in Example 4. Resin-reinforcing glass flakes of Examples 9 and 10 were produced in the same manner as those of Examples 7 and 8 respectively, except that the proportion of the cellulose nanofibers was changed to 20 mass % and, accordingly, the proportions of the silane coupling agent and resin were decreased to 40 mass % each. The resin-reinforcing glass flakes of each of Examples 7 to 10 were kneaded with acrylonitrile-styrene copolymer (Stylac 789H, manufactured by Asahi Kasei Corporation) serving as a matrix resin to obtain a resin composition. The method for kneading the glass flakes and matrix resin was the same as that in Example 1.

The proportion of the coating in the obtained resin-reinforcing fillers was measured in the same manner as in Example 1. Resin molded articles were also produced with the obtained resin compositions and their various properties were measured in the same manner as in Example 1. The results are shown in Table 5.

Comparative Example 4

A resin-reinforcing filler of Comparative Example 4 was produced in the same manner as that of Example 7, except that no cellulose nanofibers were contained in the coating and, accordingly, the proportions of the silane coupling agent and resin were increased to 50 mass % each. The proportion of the coating in the obtained resin-reinforcing filler was measured in the same manner as in Example 7. A resin molded article was also produced and its various properties were measured in the same manner as in Example 7. The results are shown in Table 5.

TABLE 5

| | | Example 7 | Example 8 | Example 9 | Example 10 | Comparative Example 4 |
|---|---|---|---|---|---|---|
| Coating | Filler substrates | Glass flakes | Glass flakes | Glass flakes | Glass flakes | Glass flakes |
| | Adhesion ratio (mass %) | 0.6 | 0.6 | 0.6 | 0.6 | 0.6 |
| | Proportion of coupling agent (mass %) | 45 | 45 | 40 | 40 | 50 |
| | Proportion of resin (mass %) | 45 | 45 | 40 | 40 | 50 |
| | Proportion of cellulose nanofibers (mass %) | 10 | 10 | 20 | 20 | 0 |
| | Type of resin | Epoxy + AS | Epoxy + AS | Epoxy + AS | Epoxy + AS | Epoxy + AS |
| | Type of cellulose nanofibers | Derived from mechanical pulp | Derived from used paper pulp | Derived from mechanical pulp | Derived from used paper pulp | — |
| | Matrix resin | Acrylonitrile-styrene copolymer | | | | |
| Properties of molded article | Maximum tensile strength (MPa) | 72 | 72 | 79 | 75 | 71 |
| | Tensile strain (%) | 1.3 | 1.3 | 1.5 | 1.3 | 1.3 |
| | Maximum flexural strength (MPa) | 107 | 106 | 104 | 107 | 102 |
| | Flexural modulus (MPa) | 7.5 | 7.6 | 7.5 | 7.5 | 7.2 |
| | Izod impact strength UN[*1] (kJ/m$^2$) | 7.6 | 7.5 | 8.0 | 7.8 | 7.5 |
| | Izod impact strength N[*2] (kJ/m$^2$) | 2.3 | 2.1 | 2.2 | 2.2 | 2.1 |

Notes
[*1]Un-notched
[*2]Notched

Examples 11 to 14

Resin-reinforcing glass flakes of Example 11 were produced in the same manner as those of Example 1, except that the type of the resin in the binder for forming the coating was changed from PE-GMA to a 1:1 mixture of an epoxy resin and AS. Resin-reinforcing glass flakes of Example 12 were produced in the same manner as the resin-reinforcing glass flakes of Example 11, except that the cellulose nanofibers were changed from cellulose mechanical pulp-derived nanofibers to used paper pulp-derived cellulose nanofibers as used in Example 4. Resin-reinforcing glass flakes of Examples 13 and 14 were produced in the same manner as those of Examples 11 and 12 respectively, except that the proportion of the cellulose nanofibers was changed to 20 mass % and, accordingly, the proportions of the silane coupling agent and resin were decreased to 40 mass % each. The resin-reinforcing glass flakes of each of Examples 11 to 14 were kneaded with acrylonitrile-butadiene-styrene copolymer (Stylac 120, manufactured by Asahi Kasei Corporation) serving as a matrix resin to obtain a resin composition. The method for kneading the glass flakes and matrix resin was the same as that in Example 1.

The proportion of the coating in the obtained resin-reinforcing fillers was measured in the same manner as in Example 1. Resin molded articles were also produced with the obtained resin compositions and their various properties were measured in the same manner as in Example 1. The results are shown in Table 6.

Comparative Example 5

A resin-reinforcing filler of Comparative Example 5 was produced in the same manner as that of Example 11, except that no cellulose nanofibers were contained in the coating and, accordingly, the proportions of the silane coupling agent and resin were increased to 50 mass % each. The proportion of the coating in the obtained resin-reinforcing filler was measured in the same manner as in Example 11. A resin molded article was also produced and its various properties were measured in the same manner as in Example 11. The results are shown in Table 6.

TABLE 6

|  |  | Example 11 | Example 12 | Example 13 | Example 14 | Comparative Example 5 |
|---|---|---|---|---|---|---|
| Coating | Filler substrates | Glass flakes | Glass flakes | Glass flakes | Glass flakes | Glass flakes |
|  | Adhesion ratio (mass %) | 0.6 | 0.6 | 0.6 | 0.6 | 0.6 |
|  | Proportion of coupling agent (mass %) | 45 | 45 | 40 | 40 | 50 |
|  | Proportion of resin (mass %) | 45 | 45 | 40 | 40 | 50 |
|  | Proportion of cellulose nanofibers (mass %) | 10 | 10 | 20 | 20 | 0 |
|  | Type of resin | Epoxy + AS | Epoxy + AS | Epoxy + AS | Epoxy + AS | Epoxy + AS |
|  | Type of cellulose nanofibers | Derived from mechanical pulp | Derived from used paper pulp | Derived from mechanical pulp | Derived from used paper pulp | — |
| | Matrix resin | Acrylonitrile-butadiene-styrene copolymer | | | | |
| Properties of molded article | Maximum tensile strength (MPa) | 64 | 66 | 65 | 64 | 64 |
|  | Tensile strain (%) | 2.0 | 2.0 | 2.0 | 2.0 | 2.0 |
|  | Maximum flexural strength (MPa) | 85 | 85 | 87 | 88 | 85 |
|  | Flexural modulus (MPa) | 5.7 | 5.8 | 5.9 | 5.9 | 5.6 |
|  | Izod impact strength UN*[1] (kJ/m$^2$) | 13 | 12 | 12 | 12 | 12 |
|  | Izod impact strength N*[2] (kJ/m$^2$) | 1.6 | 1.9 | 2.0 | 2.0 | 1.5 |

Notes
*[1]Un-notched
*[2]Notched

As shown in Tables 2 to 6, comparison of the resin molded articles of Examples with the resin molded articles of Comparative Examples formed using resin-reinforcing filler whose substrates were the same as those used in Examples but whose coating contained no nanofibers (comparison between Examples and Comparative Examples shown in the same table) reveals that the resin molded articles of Examples had higher mechanical strength than the resin molded articles of Comparative Examples. This indicates the effectiveness of containing the nanofibers. That is, when added to a resin such as polypropylene, acrylonitrile-styrene copolymer, or acrylonitrile-butadiene-styrene copolymer to produce a composite material, a filler provided with a nanofiber-containing coating is capable of improving the mechanical properties of molded articles obtained using the composite material.

INDUSTRIAL APPLICABILITY

The resin-reinforcing filler of the present invention can effectively reinforce resin molded articles including, as a matrix resin, a resin such as a polyolefin resin (particularly a polypropylene resin), acrylonitrile-styrene copolymer, or acrylonitrile-butadiene-styrene copolymer, and is therefore applicable to various uses. For example, the resin-reinforcing filler of the present invention can be suitably used, for example, in the fields of automobiles and electronic parts.

The invention claimed is:

1. A resin-reinforcing filler comprising:
   plate-like, spherical, or fibrous filler substrates; and
   a coating covering at least a portion of a surface of each of the substrates,
   wherein the coating comprises a coupling agent and nanofibers having an average fiber length of 150 nm to 20 μm and an average fiber width of 1 nm to 900 nm,
   the proportion of the coating is 0.05 to 3 mass % of the resin-reinforcing filler,
   an average particle diameter of the plate-like filler substrates is 5 μm to 2000 μm,
   an average particle diameter of the spherical filler substrates is 5 μm to 3000 μm, and
   an average fiber width of the fibrous filler substrates is 1 μm to 20 μm.

2. The resin-reinforcing filler according to claim 1, wherein the nanofibers comprise cellulose nanofibers.

3. The resin-reinforcing filler according to claim 1, wherein
   the substrates are inorganic substrates made of an inorganic material, and
   the inorganic substrates comprise substrates made of at least one selected from the group consisting of glass, mica, talc, wollastonite, kaolin, calcium carbonate, montmorillonite, silica, alumina, aramid, and carbon.

4. The resin-reinforcing filler according to claim 1, wherein the plate-like substrates are glass flake substrates.

5. The resin-reinforcing filler according to claim 4, wherein the glass flake substrates have an average thickness of 0.1 to 10 μm and an average particle diameter of 10 to 2000 μm.

6. The resin-reinforcing filler according to claim 1, wherein the plate-like substrates are mica.

7. The resin-reinforcing filler according to claim 1, wherein the spherical substrates are glass beads.

8. The resin-reinforcing filler according to claim 1, wherein the fibrous substrates are glass fibers.

9. The resin-reinforcing filler according to claim 1, wherein the fibrous substrates are carbon fibers.

10. The resin-reinforcing filler according to claim 1, wherein the coating further comprises at least one selected from the group consisting of a resin and a crosslinking agent.

11. A resin composition comprising:
    the resin-reinforcing filler according to claim 1; and
    a matrix resin.

12. The resin composition according to claim 11, wherein the matrix resin is a polyolefin.

13. The resin composition according to claim 12, wherein the polyolefin is polypropylene.

14. The resin composition according to claim 11, wherein the matrix resin is a polystyrene resin.

15. The resin composition according to claim 14, wherein the polystyrene resin is styrene-acrylonitrile copolymer or styrene-butadiene-acrylonitrile copolymer.

* * * * *